(No Model.)
F. L. ATEN.
CORN PLANTING ATTACHMENT.
No. 379,554. Patented Mar. 20, 1888.
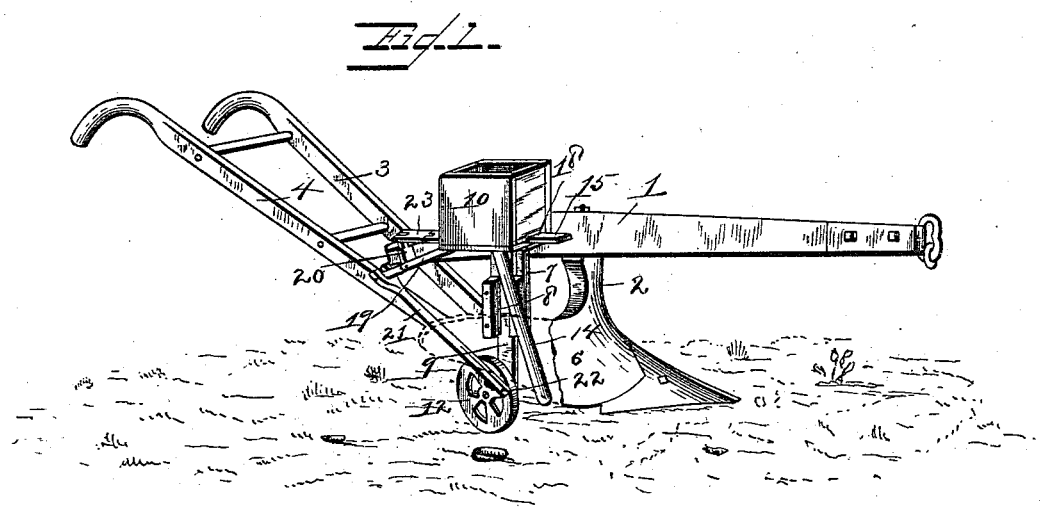
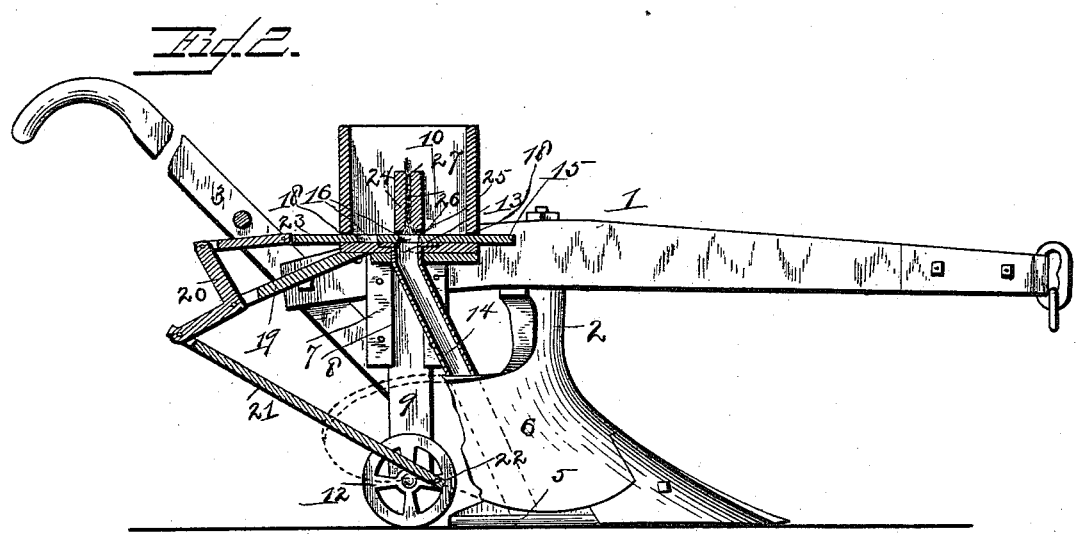
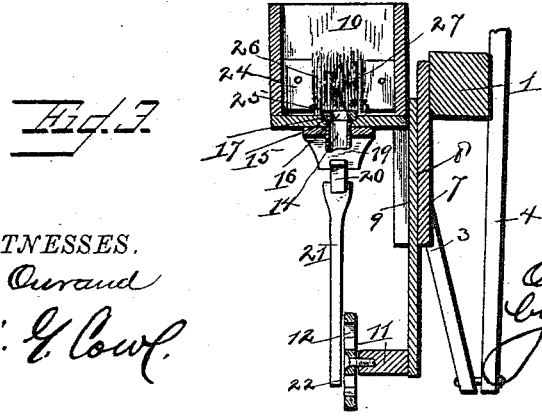
WITNESSES.
F. L. Ourand
Benj. G. Cowl
INVENTOR.
Frank L. Aten,
by Louis Bagger & Co.
Attorneys.

UNITED STATES PATENT OFFICE.

FRANK L. ATEN, OF ROUND ROCK, TEXAS.

CORN-PLANTING ATTACHMENT.

SPECIFICATION forming part of Letters Patent No. 379,554, dated March 20, 1888.

Application filed December 27, 1887. Serial No. 259,029. (No model.)

*To all whom it may concern:*

Be it known that I, FRANK L. ATEN, a citizen of the United States, and a resident of Round Rock, in the county of Williamson and State of Texas, have invented certain new and useful Improvements in Corn-Planting Attachments to Plows; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a plow provided with my improved corn-planting attachment. Fig. 2 is a longitudinal vertical sectional view taken through the seed-box, and showing the plow-beam and one handle in side view, and Fig. 3 is a transverse vertical sectional view.

The same numerals of reference indicate the same or corresponding parts in all the figures.

My invention has relation to that class of corn-planting attachments for plows of various kinds in which the planting attachment is secured adjustably at the rear of the plow-body to the plow-beam, and it contemplates certain improvements upon the planting attachment for which Letters Patent No. 371,812 were granted to me on the 18th day of October, 1887; and it consists to that end in the improved construction and combination of parts of such an attachment, as hereinafter more fully described and claimed.

In the accompanying drawings, the numeral 1 indicates the beam of the plow, which may be of any suitable construction, being either a breaking, turning, or cleaning plow, the beam in the illustrated plow, which is a usual turning plow, having the standard 2, the handles 3 and 4, the landside 5, and mold-board 6.

A downwardly-extending box or bracket, 7, having a flanged way, 8, upon its inner side, is secured to the inner side of the plow-beam, near the rear end of the same, and a standard, 9, slides within the way of this bracket or box, and has the seed-box 10 secured to its upper end, and a laterally-projecting arm or stud, 11, at its lower end, upon which a wheel, 12, is journaled.

The seed-box is formed with a seed-aperture, 13, in its bottom, from which the seed-tube 14 extends downward and forward, and the seed-slide 15, having the seed-cups 16, moves with its middle in a longitudinal groove or recess, 17, in the bottom of the seed-box, having its ends projecting out through slots 18 in the forward and rear side of the seed-box. A rearwardly-projecting bifurcated bracket, 19, extends from the bottom of the seed-box, and a bell-crank, 20, is fulcrumed at its elbow in this bracket, and has a connecting-rod, 21, pivoted to one arm, which connecting-rod is pivoted with its lower end to a wrist-pin, 22, upon the wheel at the lower end of the standard. The other arm of the bell-crank has a connecting-rod, 23, pivoted to it, which rod is pivoted at its other end to the rear end of the seed-slide, and it will be seen that the seed-slide may be reciprocated, bringing alternately one of the two seed-cups of the seed-slide to register with the seed-aperture when the wheel is revolved.

Two transverse clamping-blocks, 24, are secured in the seed-box above the seed-aperture in the bottom of the same, and these blocks are formed with recesses 26 in their facing sides, and with recesses 25 in their lower edges, with which lower recesses they may fit over the upper side of the seed-slide. A brush, 27, is clamped between these two blocks, fitting into the recesses in the meeting faces and projecting with the lower ends of its bristles in the recesses in the lower edges, serving to sweep the superfluous grains of corn off from the seed slide and cups, and it will be seen that by loosening the two blocks and letting down the bristles in the recesses the wear at the lower ends of the same may be taken up, so that the same set of bristles may last for the brush as long as they may be clamped by the blocks. The seed-tube will extend down to directly behind the mold-board, and when the plow is drawn along, turning or opening a furrow, the wheel will be revolved, traveling in the furrow just formed, and the seed will be dropped in the furrow immediately behind the mold-board, being covered by the plow at the next furrow.

The standard carrying the seeding attachment may be allowed to slide freely in the box or way of the bracket, so that the wheel may either follow all unevenness of the furrow, having the standard sliding up or down as the wheel follows the said unevenness, or the standard may be adjusted securely in the box by any suitable means, and the standard may be adjusted up sufficiently high to prevent the wheel from coming in contact with the bottom of the furrow, so that the attachment will not sow and the plow may be used as a common plow.

The attachment may be removed in a moment of time and the plow may then be used as a common plow, and it follows that the attachment may be used with any kind of plow or cultivator having a beam and an opening plow-body or shovel, and one or two handles, as the bracket may be secured to the beam or one of the handles, so as to bring the seed-box, the wheel, and the seed-tube in their proper positions with reference to the plow-body.

Having thus described my invention, I claim and desire to secure by Letters Patent of the United States—

1. The combination, with a common plow of any desired construction, of a downwardly-projecting bracket secured to the inner side of the rear end of the beam and having a box or flanged way upon its side, and a seeding attachment consisting of a standard sliding adjustably in the box or way, a seed-box at the upper end of the standard provided with a downwardly and forwardly inclined seed-tube and with a reciprocating seed-slide, a wheel journaled upon a laterally-projecting stud or arm at the lower end of the standard, a bell-crank fulcrumed upon a rearwardly-projecting arm, a connecting-rod between a wrist-pin of the wheel and one arm of the bell-crank, and a connecting-rod between the seed-slide and the bell-crank, as shown and described.

2. In a seeding attachment for plows, the combination of a standard having a seed-box at its upper end provided with a longitudinal groove in the upper side of the bottom, and with slots in the end walls registering with the groove and having an arm projecting laterally from the lower end, a wheel journaled upon the said arm, a seed-slide in the groove, a bell-crank fulcrumed upon a rearwardly-projecting bracket of the box, a connecting-rod pivoted to the wheel and to the rear arm of the bell-crank, and a connecting-rod pivoted to the upper arm of the bell crank and to the rear end of the seed-slide, as shown and described.

In testimony that I claim the foregoing as my own I have hereunto affixed my signature in presence of two witnesses.

FRANK L. ATEN.

Witnesses:
MASSENA WIESS,
WILLIAM H. TRIGGS.